Aug. 11, 1936. M. OVESTRUD ET AL 2,050,458
APPARATUS FOR PREPARING AGGREGATES
Filed Feb. 19, 1932 2 Sheets-Sheet 2
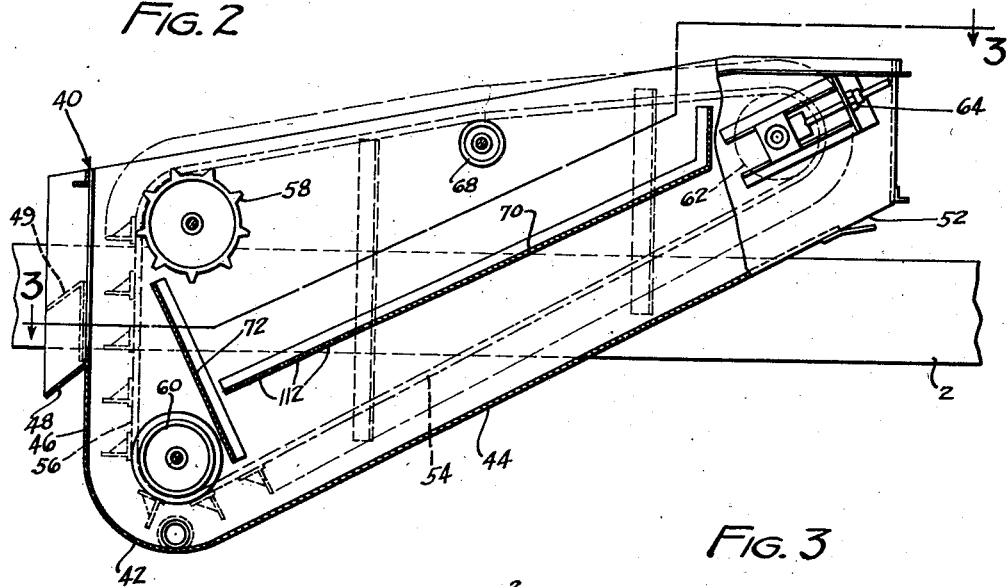
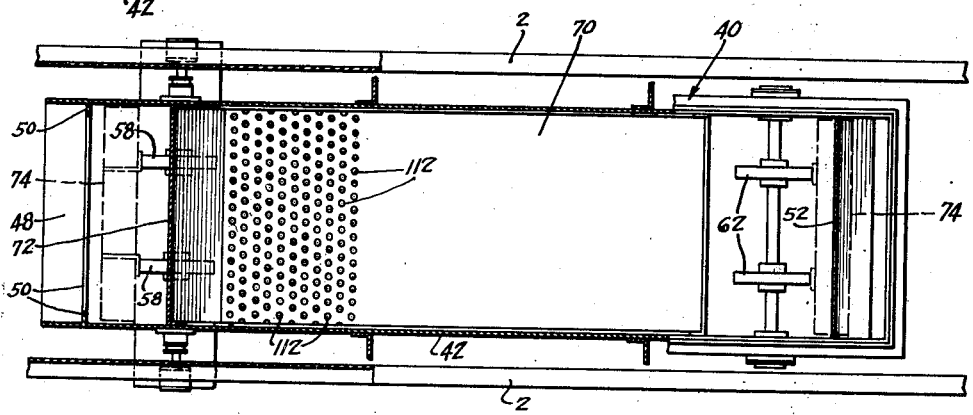
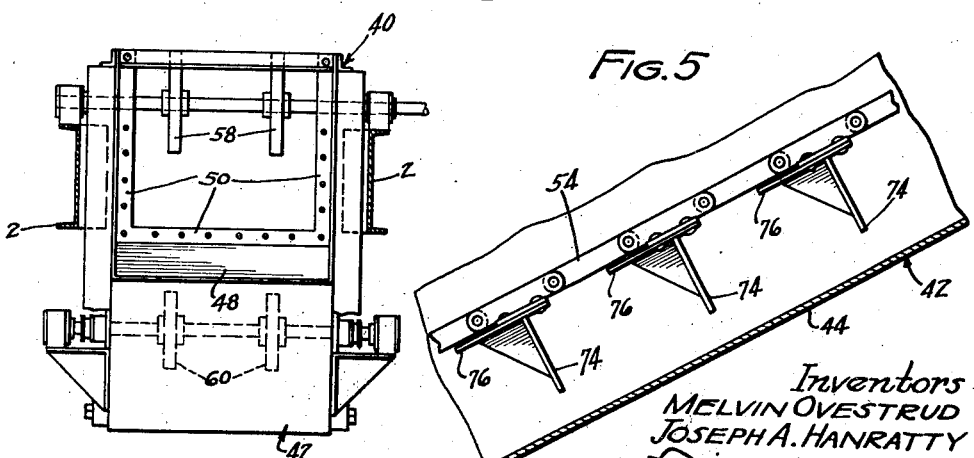
Inventors
MELVIN OVESTRUD
JOSEPH A. HANRATTY
ATTORNEYS Patented Aug. 11, 1936

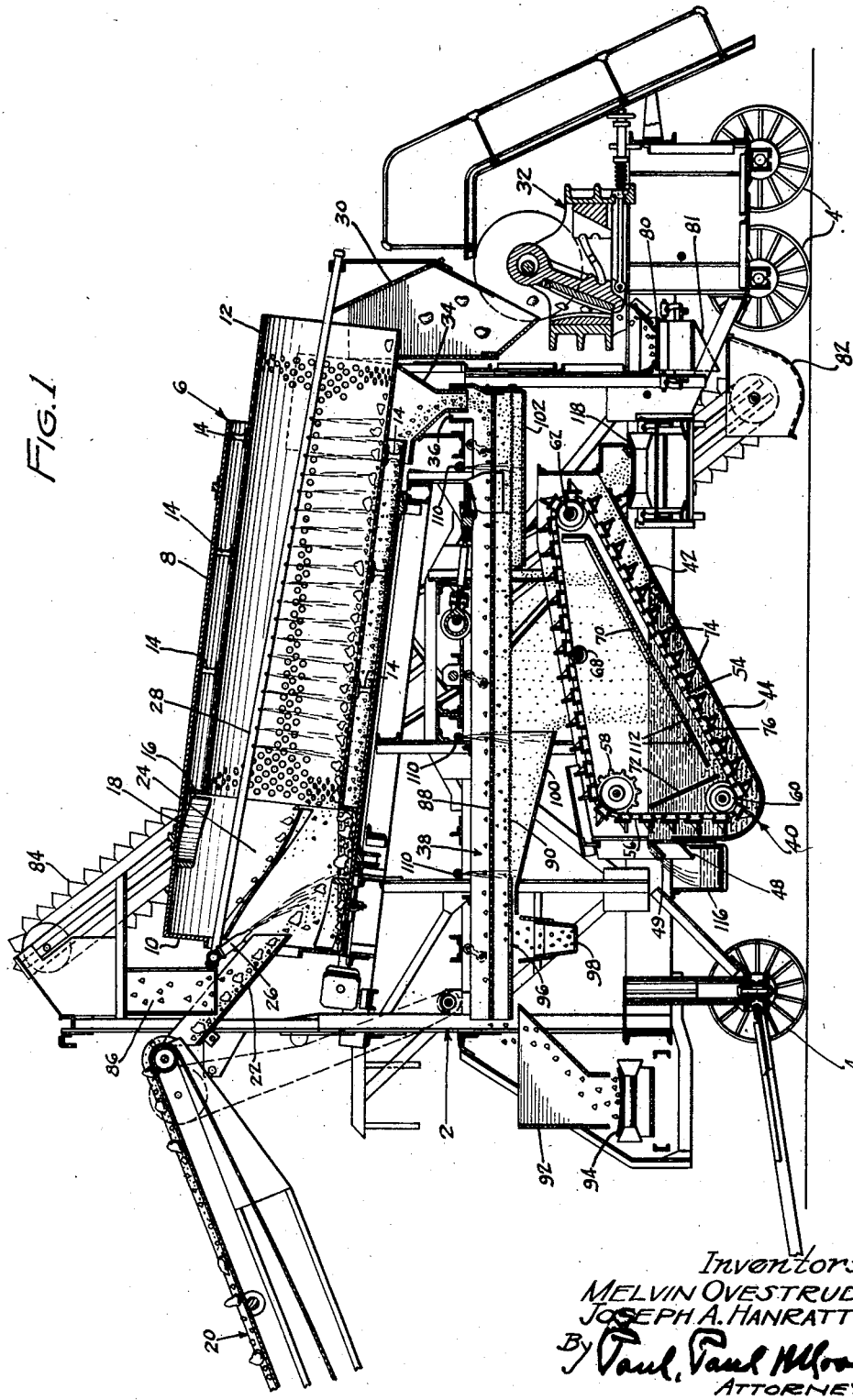

2,050,458

UNITED STATES PATENT OFFICE 2,050,458

APPARATUS FOR PREPARING AGGREGATES

Melvin Ovestrud, Minneapolis, and Joseph A. Hanratty, St. Paul, Minn., assignors to Pioneer Gravel Equipment Manufacturing Company, Minneapolis, Minn., a corporation of Delaware Application February 19, 1932, Serial No. 594,038

2 Claims. (Cl. 209—12)

This invention relates to apparatus for treating rock material, either quarried rock or pit run gravel, to produce aggregates for concrete construction work. Many construction jobs are located remotely from a regularly established commercial plant for producing sand and gravel with the result that the price of these necessary items is greatly increased because of the necessity of shipping them. This invention relates particularly to a portable apparatus which may be readily set up close to the work in progress whereby shipping charges are eliminated.

It is well known that it is desirable in construction work to have sand and gravel of accurate and uniform gradation, and that it is also very desirable to have the particles as clean as possible. Various types of portable apparatus for removing rock material from a pit and then crushing and screening it to produce particles of uniform size have heretofore been proposed. However, they have never been completely satisfactory and a broad purpose of the present invention is the provision of a new form of apparatus of this general type which embodies a compact and efficient arrangement of parts so as to be capable of being easily made portable, and which will act to economically clean the material to a high degree as well as properly screen it and crush it. More particularly it is an object of the invention to provide a portable apparatus for efficiently and economically screening, crushing and washing rock material.

A further object of the invention is the provision in an apparatus for preparing aggregates, of a combined scrubber and revolving screen which will readily scrub, separate, and wash the particles to be treated.

An additional object of the invention resides in the provision of a new form of dehydrator.

Among the novel features of the invention is also included the combination in a machine for preparing aggregates, of a rotary or revolving screen for separating the larger particles to be sent to the crusher from the smaller particles to be graded, and a shaker screen for sizing the smaller particles.

Various objects of the invention will become more readily apparent upon a detailed study of the accompanying drawings and specification together with the appended claims.

In the drawings, which are illustrative of the invention, Fig. 1 is a longitudinal cross-sectional view through an apparatus embodying the principles of this invention;

Fig. 2 is a longitudinal cross-sectional view through the dehydrator;

Fig. 3 is a view along the lines 3—3 of Fig. 2, the drag chain being shown removed;

Fig. 4 is an end view of the dehydrator with the detachable spillway removed and the drag chain also removed; and—

Fig. 5 is a detailed view showing a portion of the drag chain of the dehydrator.

The apparatus comprises a frame generally designated at 2, which is preferably formed of metallic beams of any desired type, suitably trussed, and which is mounted upon wheels 4 so as to be portable. Mounted at the upper part of the frame is an inclined member generally designated at 6 which comprises a combined scrubber and revolving screen. This combined scrubber and screen comprises a first cylinder 8 which has imperforate walls and is provided with an inwardly extending flange 10 at its upper, inlet end. Extending therein from its lower outlet end is a cylindrical screen 12, of smaller diameter than the cylindrical member 8, and secured concentrically with respect to cylinder 8 by means of any suitable supporting members 14. The inwardly extending end of the cylindrical screen 12 is secured to an anular wall 16 which may, if desired, be a flange formed integrally with the screen 12. The outer periphery of this annular wall 16 makes a tight fit with the inner walls of the cylinder 8 and is preferably fastened thereto as, for instance, by welding. That portion of the cylinder 8 between the annular wall 16 and its inlet end constitutes a scrubber or scrubbing chamber 24 and is provided with scrubbing blades 18 which are fixed to the inner walls of cylinder 8 in any desired manner. The combined scrubber and revolving screen 6 is mounted for rotation upon suitable bearings or rollers on the frame 2.

A conveyer generally designated at 20 elevates the rock and gravel material to be treated from the pit and discharges it upon a chute 22 leading into the scrubber 24. Water is directed into the scrubber 24 by means of nozzle 26 and a perforated pipe 28 extending longitudinally of the screen 12 sprays water along the inside of the screen 12 substantially throughout its length as will be evident from Fig. 1. The lower end of screen 12 discharges into a hopper 30 which leads directly to a crusher generally designated at 32 whereas the lower end of the cylindrical drum 8 discharges into a hopper 34 which leads directly to a receiving hopper 36 of a reciprocating or shaker screen generally designated at 38. The shaker screen shown has an upper deck with relatively coarse openings as compared to the openings in the lower deck which latter openings permit the passage therethrough of only sand. The combined scrubber and revolving screen and the shaker screen are each positioned longitudinally of the frame 2, centrally thereof, with the shaker screen 38 directly below the revolving screen and scrubber. Any desired mechanism for reciprocating the shaker screen may be provided.

Positioned longitudinally of the main frame and directly below the shaker screen 38 is a dehydrator generally designated at 40 and shown with particularity in Figs. 2, 3, 4, and 5. The dehydrator comprises a tank 42 which is generally triangular in longitudinal cross-section and which is provided with a lower inclined wall 44 which adjoins a substantially vertical wall 46. The wall 46 is provided with a spillway 48 permanently welded thereto over which water collecting in the tank 42 flows. If it is desired to raise the level of the water within the dehydrator, it is possible to attach an auxiliary spillway 49 as shown in dotted lines in Fig. 2. The attachment is made by means of bolts passing through the holes in the inwardly extending flanges 50. The wall 44 is provided with an outlet opening 52 for the sand which is positioned above the level of the spillway 48 or that of the auxiliary spillway 49 shown in dotted lines. Mounted for movement within the tank 42 is an endless drag chain having a run 54 adjacent and substantially parallel to the inclined wall 44. It also has a run 56 which is adjacent and substantially parallel to the wall 46. The chain passes about a driving sprocket 58 and rollers 60 and 62, the roller 62 being provided with any desired type of tensioning means 64. In order to support the upper run 66 of the chain, there is also provided an idler roller 68.

A baffle member 70 extends from side to side of the tank 42 and from a point adjacent its upper end to a point adjacent its lower end, it being substantially parallel to the lower inclined wall 44. A second baffle member 72 is substantially at right angles to the baffle member 70 and spaced therefrom a slight extent, baffle member 72 following generally the direction of wall 46. In order to prevent undue buckling of the lower run 54 of the chain in the direction of baffle member 70 and away from the wall 44, each individual conveyer flight 74 of the chain is provided with an extension 76 which extends beyond the end of the particular link to which the individual conveyer flight is attached. This will greatly reduce the ability of the lower flight to buckle away from the wall 44 as will be evident from the enlargement shown in Fig. 5, and assure proper operation of the chain to elevate sand along the wall 44.

It will be seen that the dehydrator in effect forms an inner and an outer settling chamber connected by a restricted passageway. The outer chamber is constituted by the tank 42 and the inner settling chamber is constituted by the baffles 70 and 72, and the side walls of the tank 42. If desired, the inner settling chamber may be formed of parts entirely separate from the outer chamber.

When the machine is in operation, material is raised on the conveyer 20 and deposited on the chute 22 as previously described. From the chute 22 the material passes into the scrubbing chamber in which there is a collection of water as shown in Fig. 1 due to the fact that before the water can escape it must rise to the level of the annular wall 16 and pass out over the cylindrical screen 12. Due to the presence of this accumulation of water, the particles to be treated are thoroughly scrubbed upon rotation of the scrubber to which are attached the scrubbing blades 18. The material passes from the scrubbing chamber on to the revolving screen 12 and the particles of smaller size than the openings in the screen 12 pass therethrough to the annular space between the screen 12 and the cylinder 8. The larger particles pass out of the discharge end of the screen 12 and into a hopper 30 from which they are delivered to the crusher 32. The perforated pipe 28 sprays water on the material all during its passage from the scrubber to the discharge from member 6 with the result that a great amount of washing takes place during this stage. Also, all of the water issuing out of the nozzle 26 and out of the perforations of the pipe 28 must of necessity collect in the hopper 34 with the result that the particles which have passed through the revolving screen 12 are again thoroughly washed in the course of their passage to the shaker screen 38.

The member 6 provides for an exceedingly thorough and complete scrubbing of the particles. They are not only scrubbed in the chamber 24 but are further scrubbed and ground together during their entire passage either within the revolving screen or within the annular space between this screen and the drum 8.

The discharge of the crusher 32 drops upon a conveyer generally designated at 80 which leads to a chute 81 which feeds the material directly to the buckets of the conveyer 84. The bin or hopper 82 collects any particles which may be spilled. Conveyer 84 deposits the material in a chute 86 leading to the chute 22. As a consequence, the material which has been passed through the crusher 32 is again returned to the scrubber and to the revolving screen to be again washed and separated so that the particles which are now of sufficient fineness will pass through the screen 12 and be led to the shaker screen 38.

The particles leaving the cylinder 8 and passing through the hopper 34 to the shaker screen 38 advance from right to left, looking at Fig. 1. The upper deck 88 has openings which are relatively coarser than the openings in the lower deck 90. The largest sized particles reaching shaker screen 38 advance all the way to the left upon upper deck 88 and into the hopper 92 leading to a conveyer 94 on which they are carried to any convenient point of discharge. Those particles next smaller in size are capable of passing through the upper deck 88 but not capable of passing through the lower deck 90. These particles accordingly pass through the upper deck 88 and advance to the left on the lower deck 90 to a discharge opening 96 which is directly above a conveyer 98 leading to any convenient point of discharge. The smallest particles, namely those constituting the sand, pass through the lower deck 90 and either drop directly into the dehydrater 40 or upon the chutes 100 or 102 which discharge into the dehydrator. It will be observed that chute 102 is practically horizontal but any sand collecting thereon is readily discharged into the dehydrator because of the relatively great flow of water passing downwardly through the hopper 34 from the revolving screen and scrubber and because of the reciprocating motion imparted to it by the driving mechanism of the shaker screen 38 to which it is attached.

In order to insure a thorough rinsing of the various particles there are provided a plurality of transversely extending perforated pipes 110 which direct sprays of water above the shaker screen 38. As shown in Fig. 1, the water issuing from these pipe 110 is collected by means of the chutes 100 and 102 and directed into the dehydrator.

The material falling into the dehydrator drops into the inner settling chamber and upon the baffle member 70, working its way down toward its lower edge where it either passes over the same or through the perforations 112 into the outer settling chamber. It falls in the direction of the lower inclined wall 44 and is dragged toward the sand discharge opening 52 by means of the lower run 54 of the drag chain. Due to the construction of the individual conveyer flights which overlap their adjacent links, as previously described, this lower run 54 is not adapted to buckle or bend in a direction away from the lower wall 44. The water entering the dehydrator of course remains at the level of the spillway as indicated in Fig. 1. Consequently, the main flow of water will be in a direction against the general direction of the lower run 54 which removes the sand. On some construction jobs it is desired to have a higher percentage of gravel with respect to sand, than on other construction jobs. Where such a high percentage of gravel is required, it has heretofore been a problem to dispose of the sand. However, in the present apparatus, the proportion of sand may be regulated by adjusting the height of the spillway over which the water in the dehydrator flows. With the temporary spillway 49 in place, as shown in Fig. 1, the level of the water is quite high, substantially at the level of the upper edge of baffle member 72, and there is relatively little possibility of any sand working its way out over this spillway. However, if the device is operated with the permanently welded spillway 48, the water level will be correspondingly lower and a portion of the sand will find its way to the spillway and be lost in the discharge flume 116.

The various parts are driven by any convenient means from any convenient source of power. Preferably, a single source of power is used for operating the conveyers 20, 80, 84, 94 and 118, the last mentioned conveyer being used to carry away the dehydrated sand. The same source of power is also used for the purpose of rotating the combined scrubber and rotating screen, for operating the crusher, for reciprocating the shaker screen, and for operating the drag chain in the dehydrator. Again, the same source of power may be used for pumping the water used in the washing process. Any desired type of drives or transmission may be employed.

It will be seen that an apparatus as described above will function to readily wash, crush and screen rock materials to be converted into sand and gravel and that it will produce a very clean product as well as an accurately sized product. The apparatus is completely portable and very compact with the result that it can be readily transported from place to place.

We claim as our invention:

1. In a portable apparatus capable of being readily transported from place to place for treating raw gravel and classifying it into a plurality of different sizes and grades, a frame, a scrubber mounted in the upper portion of the frame and adapted for rotary movement, means for delivering the raw material into the scrubber, a revolving screen mounted to receive the raw material from the scrubber and operating to separate the coarse material therefrom, a sizing screen mounted directly beneath the scrubber and the revolving screen and adapted to receive the material passing through the perforated walls of the revolving screen, means for imparting a shaking motion to the sizing screen, means for spraying water into the material passing over the sizing screen to wash it, a dehydrator mounted directly beneath the sizing screens and adapted to receive the fines therefrom, and means for receiving the fines from the dehydrator, said scrubber, revolving screen, sizing screen and dehydrator being arranged in compact relation and substantially in vertical alignment and substantially within the confines of said frame.

2. In a portable apparatus for treating raw gravel and classifying it into a plurality of different sizes and grades, a framework, a scrubber mounted within the upper portion of said framework for rotary movement, means for delivering the raw material into one end of the scrubber, means for introducing water into the scrubber to wash the raw material delivered thereinto, a revolving screen mounted to receive the raw material from the scrubber and adapted to separate the coarse material therefrom, a sizing screen mounted directly beneath the scrubber and the revolving screen and adapted to receive the material passing through the perforated walls of the revolving screen, means for imparting a shaking motion to the sizing screen, said sizing screen being adapted to separate into a plurality of grades, according to size, the material delivered thereto, means for spraying water onto the material passing over the sizing screen to further wash it, a dehydrator mounted directly beneath the sizing screen and adapted to receive the fines therefrom, means for receiving the fines from the dehydrator, and means at the discharge end of the revolving screen adapted to receive certain of the material and return it to the scrubber for further treatment, said apparatus being mounted as a compact unit structure with said scrubber, revolving screen, sizing screen and dehydrator in substantially vertical alignment and substantially within the confines of said framework.

JOSEPH A. HANRATTY.
MELVIN OVESTRUD.